US012767512B2

(12) United States Patent
Marquardt et al.

(10) Patent No.: US 12,767,512 B2
(45) Date of Patent: Oct. 20, 2026

(54) DETERMINATION OF THE FUNCTIONALITY OF A CLOSED LOOP CONTROL VALVE OF AN APPARATUS FOR FILLING CONTAINERS

(71) Applicant: KRONES AG, Neutraubling (DE)

(72) Inventors: Christoph Marquardt, Mintraching (DE); Manfred Ziegler, Passau (DE); Heiko Schmidtmeyer, Regensburg (DE); Thomas Du Bellier, Regensburg (DE); Lutz Kampmann, Moetzing (DE)

(73) Assignee: KRONES AG, Neutraubling (DE)

( * ) Notice: Subject to any disclaimer, the term of this patent is extended or adjusted under 35 U.S.C. 154(b) by 212 days.

(21) Appl. No.: 18/886,499

(22) Filed: Sep. 16, 2024

(65) Prior Publication Data

US 2025/0092962 A1 Mar. 20, 2025

(30) Foreign Application Priority Data

Sep. 15, 2023 (DE) ..................... 10 2023 125 021.3

(51) Int. Cl.
*B67C 3/00* (2006.01)
*B67C 3/28* (2006.01)
*F16K 37/00* (2006.01)

(52) U.S. Cl.
CPC ................ *B67C 3/007* (2013.01); *B67C 3/28* (2013.01); *F16K 37/0041* (2013.01); *F16K 37/0083* (2013.01)

(58) Field of Classification Search
CPC ........... B67C 3/007; B67C 3/28; B67C 3/287; F16K 37/0083; F16K 37/0041
See application file for complete search history.

(56) References Cited

U.S. PATENT DOCUMENTS

| | | | | |
|---|---|---|---|---|
| 9,428,373 | B2 | 8/2016 | Tanaka et al. | |
| 11,761,556 | B2 | 9/2023 | Inoue et al. | |
| 2013/0110418 | A1 | 5/2013 | Nousiainen | |
| 2013/0306190 | A1* | 11/2013 | Tanaka | B67C 3/286 141/94 |

(Continued)

FOREIGN PATENT DOCUMENTS

| | | | |
|---|---|---|---|
| DE | 102013100702 | A1 | 7/2014 |
| DE | 102020127346 | A1 | 4/2022 |
| EP | 4155253 | A1 | 3/2023 |

(Continued)

OTHER PUBLICATIONS

Machine translation of JP2002527313A.
English abstract of JP06054596.

*Primary Examiner* — Timothy P. Kelly
(74) *Attorney, Agent, or Firm* — Caesar Rivise, PC

(57) ABSTRACT

The invention relates, inter alia, to an apparatus for filling containers with a filling material. The apparatus comprises a closed loop control valve for the filling material and a diagnostic device. The diagnostic device is configured to monitor a control value of a control variable of the closed loop control valve during closed loop control and to determine a state of functionality of the closed loop control valve as a function of the monitored control value. Advantageously, the apparatus can allow for a functionality and thus wear of the closed loop control valve to be monitored and detected during operation.

20 Claims, 2 Drawing Sheets

(56) References Cited

U.S. PATENT DOCUMENTS

| | | | |
|---|---|---|---|
| 2023/0099328 | A1 | 3/2023 | Kuschnerus et al. |
| 2023/0286204 | A1 | 9/2023 | Winzinger |

FOREIGN PATENT DOCUMENTS

| | | | |
|---|---|---|---|
| EP | 4241961 | A2 | 9/2023 |
| JP | 06054596 | | 7/1994 |
| JP | 2003341795 | A | 12/2003 |
| JP | 2014093994 | A | 5/2014 |
| JP | 6293389 | B2 | 3/2018 |
| JP | 2020118283 | A | 8/2020 |
| JP | 2023024785 | A | 2/2023 |
| JP | 2023104150 | A | 7/2023 |
| WO | WO2012137317 | A1 | 10/2012 |

* cited by examiner

DETERMINATION OF THE FUNCTIONALITY OF A CLOSED LOOP CONTROL VALVE OF AN APPARATUS FOR FILLING CONTAINERS

CROSS REFERENCE TO RELATED APPLICATIONS

This application claims the benefit under 35 U.S.C. § 119 (a) of German Patent Application No. DE 10 2023 125 021.3, filed Sep. 15, 2023 entitled DETERMINATION OF THE FUNCTIONALITY OF A CLOSED LOOP CONTROL VALVE OF AN APPARATUS FOR FILLING CONTAINERS, and whose entire disclosure is incorporated by reference herein.

TECHNICAL FIELD

The invention relates to an apparatus for filling containers with a filling material, wherein the apparatus has a closed loop control valve. The invention further relates to a method for determining the functionality of a closed loop control valve of an apparatus for filling containers with a filling material.

TECHNICAL BACKGROUND

Apparatuses for filling containers, such as a rotary filler, can use closed loop control valves at various locations. For example, a closed loop control valve can be arranged at a filling material inlet to a filling material vessel of the filler in order to regulate a fill level in the filling material vessel to a constant value. Closed loop control valves can also be integrated in the filling stations of the filler to regulate the flow of the filling material when filling the containers.

Closed loop control valves can wear out over their lifetime. For example, the sealing surface between the valve seat and the valve member can wear out over time, a sealing elastomer insert can wear out over time, or an actuator of the closed loop control valve can wear out over time. If the wear is advanced, the closed loop control valve may suddenly fail (leak).

Traditionally, closed loop control valves can be serviced, overhauled or replaced at specific intervals, e.g., after 6000 operating hours or once a year. A disadvantage of this technology may be that no reliable statements can be made regarding the durability or wear of the closed loop control valves during operation. For example, the maintenance interval can be selected to be too long or too short. Only rough information about service life can be given because external influences (chemistry, temperature, manufacturing accuracy, material fluctuations, etc.) can cause a large variation.

The invention is based on the object of providing an improved monitoring of the function of a closed loop control valve of an apparatus for filling containers.

SUMMARY OF THE INVENTION

The object is achieved by the features of the independent claims. Advantageous developments are specified in the dependent claims and the description.

One aspect of the present disclosure relates to an apparatus for filling containers with filling material. The apparatus has (at least) one closed loop control valve for the filling material (e.g., configured and arranged to regulate a flow of the filling material or to regulate a fill level or a pressure in a filling material vessel of the apparatus). The apparatus has a diagnostic device which is configured to monitor a control value of a control variable, preferably of a valve lift (e.g., specified without dimension, in percent, or with a unit of length or the like) or of a valve opening (e.g., specified without dimension, in percent, or with a unit of length or area or the like), of the (e.g., respective) closed loop control valve during closed loop control (e.g., of the flow or fill level or pressure). The diagnostic device is further configured to determine a (e.g., normal and/or impaired) state of functionality, preferably a state of wear, of the (e.g., respective) closed loop control valve as a function of the monitored control value.

Advantageously, the apparatus can allow for the functionality and thus wear of the closed loop control valve to be monitored and determined during operation of the apparatus and during closed loop control by means of the closed loop control valve. When monitoring the control value, anomalies, etc., for example, can be detected, from which the state of functionality of the closed loop control valve can be deduced. This makes it possible to see individually for each closed loop control valve when a replacement or maintenance is necessary. This determination can also be carried out in advance, so that one can respond not only after the closed loop control valve has failed, but already when there is a risk of the closed loop control valve failing. Maintenance etc. can thus be planned preventively. An unnecessary, premature replacement could thus be avoided. Monitoring, etc. can be done automatically and without removal and disassembly, even during production. Moreover, this allows for each closed loop control valve in the apparatus to be monitored individually, which is a significant improvement compared to conventional random disassembly and testing. For example, it would also be possible to immediately detect and respond if a push rod on the closed loop control valve were to come loose.

For example, the diagnostic device can be further configured to receive the control value from a signal output of the closed loop control valve or a closed-loop control controller/closed-loop control device associated with the closed loop control valve.

A closed loop control variable (process variable, regulating variable) for closed loop controlling can preferably be a detected flow through the closed loop control valve or a detected fill level in a filling material vessel of the apparatus or a detected pressure in a filling material vessel of the apparatus.

A reference variable (desired variable, set point variable) for closed-loop controlling can preferably be a desired flow through the closed loop control valve or a desired fill level in a filling material vessel of the apparatus or a desired pressure in a filling material vessel of the apparatus.

In one exemplary embodiment, the diagnostic device is further configured to determine the state of functionality of the closed loop control valve also as a function of a permissible control value range (e.g., specified by means of a user interface of the apparatus), wherein preferably the state of functionality of the closed loop control valve is determined as an impaired state of functionality if the monitored control value is outside the permissible control value range, and/or is determined as a normal state of functionality if the monitored control value is within the permissible control value range. This allows for easily detecting an anomaly in the operation of the closed loop control valve, for example if the control value fluctuates more than normal or fluctuates in a different range than normal.

Preferably, the impaired state of functionality may indicate that the closed loop control valve is still functioning, but that a failure (e.g., due to wear) is to be expected.

Preferably, the impaired state of functionality may indicate an expected failure of the closed loop control valve.

In another exemplary embodiment, the permissible control value range is in a range ≥50%, ≥55% or ≥60% and/or ≤75%, ≤70% or ≤65% of a maximum value of the control variable. The closed loop control valve is therefore advantageously designed such that, during normal operation and without the occurrence of an anomaly, there is sufficient power reserve for rapid response closed loop control.

In one embodiment, the permissible control value range is specified as a function of at least one of:

- an output (e.g., container output per unit of time) of the apparatus;
- a format and/or a filling volume of the containers;
- a fill level in a filling material vessel of the apparatus;
- a pressure in a filling material vessel of the apparatus;
- a pre-pressure of the filling material upstream of a filling material vessel of the apparatus; and
- a temperature of the filling material.

Advantageously, different permissible control value ranges can thus be specified for different operating parameters and operating conditions, e.g., a first permissible control value range for a first output of the apparatus and a second, lower permissible control value range for a second, smaller output of the apparatus.

In a further embodiment, the diagnostic device is further configured to monitor the control value of the closed loop control valve during closed loop control such that the control value is monitored in a specified time window and/or in a steady state (of the control value). Preferably, the diagnostic device can further be configured to determine the state of functionality of the closed loop control valve as a function of the monitored control value such that the state of functionality of the closed loop control valve is determined as a function of (e.g., only) the control value monitored in the specified time window and/or in the steady state. This can advantageously result in anomaly detection being carried out when the anomaly can be particularly significant, namely preferably when the control value is steady.

In one embodiment variant, the specified time window can:

- begin after a (e.g., container filling) start phase of the apparatus; and/or
- begin no earlier than 1 min, no earlier than 2 min or no earlier than 3 min after a (e.g., container filling) start of the apparatus; and/or
- end before a (e.g., container filling) stop phase of the apparatus; and/or
- end no later than 3 min, no later than 2 min or no later than 1 min before a (e.g., container filling) stop of the apparatus; and/or
- end before a change in the output of the apparatus and/or begin after a change in the output of the apparatus.

In another embodiment variant, the diagnostic device is further configured to monitor the control value of the closed loop control valve during closed loop control such that the control value is monitored under substantially constant operating conditions of the apparatus. Preferably, the diagnostic device can further be configured to determine the state of functionality of the closed loop control valve as a function of the monitored control value such that the state of functionality is determined as a function of (e.g., only) the control value monitored at the substantially constant operating conditions. This can advantageously result in anomaly detection being carried out when the anomaly can be particularly significant, namely when all other major parameters of the apparatus remain substantially the same.

In one exemplary embodiment, the diagnostic device is further configured to determine that substantially constant operating conditions exist when at least one of the following applies:

- an output of the apparatus is within a specified output range;
- a container locking device of the apparatus is open;
- a fill level in a filling material vessel of the apparatus is within a specified fill level range;
- a pressure in a filling material vessel of the apparatus is within a specified pressure range;
- a valve of a cullet removal system of the apparatus is closed;
- a pre-pressure of the filling material when fed to a filling material vessel of the apparatus is within a specified pre-pressure range; and/or
- a temperature of the filling material is within a specified temperature range.

In one exemplary embodiment, the apparatus comprises a flow detection device arranged to detect a filling material flow through the closed loop control valve. Preferably, the diagnostic device can further be configured to determine the state of functionality of the closed loop control valve also as a function of a filling material flow detected by the flow detection device, preferably by comparing the detected filling material flow and a theoretical filling material flow through the closed loop control valve, which is determined as a function of the monitored control value. This allows for easily detecting when the actual (detected) flow differs greatly from the theoretical flow, which may be due to advanced wear of the closed loop control valve.

Preferably, the diagnostic device can be further configured to determine the state of functionality:

- as an impaired state of functionality when a deviation between the measured filling material flow and the theoretical filling material flow is greater than a limit value; and/or
- as a normal state of functionality when a deviation between the measured filling material flow and the theoretical filling material flow is smaller than a or the limit value.

In another exemplary embodiment, the apparatus further comprises an (e.g., visual, acoustic and/or haptic) output device for outputting information to a user. Preferably, the diagnostic device can further be configured to operate the output device such as to output information regarding the determined state of functionality. This advantageously allows for issuing instructions and warnings regarding the functionality of the closed loop control valve and/or requesting that the closed loop control valve be replaced at the next opportunity.

A further aspect of the present disclosure relates to a method for determining the functionality of a closed loop control valve of an apparatus, preferably as disclosed herein, for filling containers with a filling material. The method comprises closed-loop controlling (e.g., a flow of the filling material or a fill level in a filling material vessel of the apparatus or a pressure in a filling material vessel of the apparatus) by means of the closed loop control valve. The method comprises monitoring a control value of a control variable, preferably of a valve lift or valve opening, of the closed loop control valve by means of a diagnostic device during closed loop control. The method comprises determining a state of functionality of the closed loop control valve as a function of the monitored control value by means of the diagnostic device. Optionally, the method can further comprise outputting the determined state of functionality to a user by means of an output device. Advantageously, the method can achieve the same advantages as already described herein with reference to the apparatus. The same applies to the following, preferred exemplary embodiments of the method.

In one exemplary embodiment, determining the state of functionality of the closed loop control valve is further dependent on a permissible control value range (e.g., specified by means of a user interface of the apparatus). Preferably, the state of functionality of the closed loop control valve can be determined as an impaired state of functionality if the monitored control value is outside the permissible control value range. Alternatively or additionally, the state of functionality of the closed loop control valve can be determined as a normal state of functionality if the monitored control value is within the permissible control value range.

Preferably, the permissible control variable range (e.g., before or when commissioning the apparatus) can be determined empirically and/or by simulation, preferably for different outputs of the apparatus, different fill levels of a filling material vessel of the apparatus, different pressures of a filling material vessel of the apparatus, different pre-pressures of the filling material when fed to a filling material vessel of the apparatus and/or different temperatures of the filling material.

In another exemplary embodiment, the control value is monitored in a specified time window, in a steady state (of the control value) and/or under substantially constant operating conditions of the apparatus. Preferably, the state of functionality of the closed loop control valve can be determined as a function of (e.g., only) the control value monitored in the specified time window, in the steady state and/or under the substantially constant operating conditions.

In another exemplary embodiment, the method further comprises detecting a filling material flow through the closed loop control valve by means of a flow detection device. Preferably, the state of functionality of the closed loop control valve can also be determined as a function of the detected filling material flow, preferably by comparing the detected filling material flow and a theoretical filling material flow through the closed loop control valve, wherein the theoretical filling material flow is determined as a function of the monitored control value.

Preferably, an impaired state of functionality can be determined when a deviation between the measured filling material flow and the theoretical filling material flow is greater than a limit value. Alternatively or additionally, a normal state of functionality can be determined when a deviation between the measured filling material flow and the theoretical filling material flow is smaller than a or the limit value.

In another exemplary embodiment, the apparatus has a, preferably annular, filling material vessel, and the closed loop control valve is arranged upstream (in the direction of movement of the filling material) of the filling material vessel for closed-loop controlling a fill level or a pressure in the filling material vessel. Alternatively, the closed loop control valve can be, for example, a filling valve with which the filling material can be delivered to a container for filling the container, for closed-loop controlling the flow of the filling material. Alternatively, the closed loop control valve can be connected to a filling valve, with which the filling material can be delivered to a container for filling the container, for closed-loop controlling the flow of the filling material.

In another exemplary embodiment, the apparatus has at least one filling station for filling the containers, and the closed loop control valve is included in the at least one filling station or connected to the at least one filling station. Alternatively or additionally, the apparatus has a rotary filler which comprises the closed loop control valve.

Another aspect of the present disclosure relates to container processing facility for manufacturing, cleaning, coating, checking, filling, closing, labeling, printing, and/or packaging containers for liquid mediums, preferably beverages or liquid foods. The container processing facility can comprise the apparatus as disclosed herein.

For example, the containers can be configured as bottles, cans, canisters, cartons, vials, etc.

Preferably, the term "diagnostic device" can refer to an electronic system (e.g., embodied as a driver circuit or with microprocessor(s) and memory) that can perform processing tasks depending on the configuration. Optionally, the diagnostic device can be part of a closed-loop control device that can perform closed-loop control tasks. The closed-loop control device can comprise electronics, a mechanical, pneumatic and/or hydraulic control. It is possible for the closed-loop control device to be part of a closed-loop control and control device that can also perform control tasks.

The preferred embodiments and features of the invention described above can be combined with one another as desired.

BRIEF DESCRIPTION OF THE DRAWINGS

Further details and advantages of the invention are described below with reference to the accompanying drawings. In the figures.

The embodiments shown in the drawings correspond at least in part, so that similar or identical parts are provided with the same reference signs and reference is also made to the description of other embodiments or figures for the explanation thereof to avoid repetition.

DETAILED DESCRIPTION OF EMBODIMENTS

Figure 1:
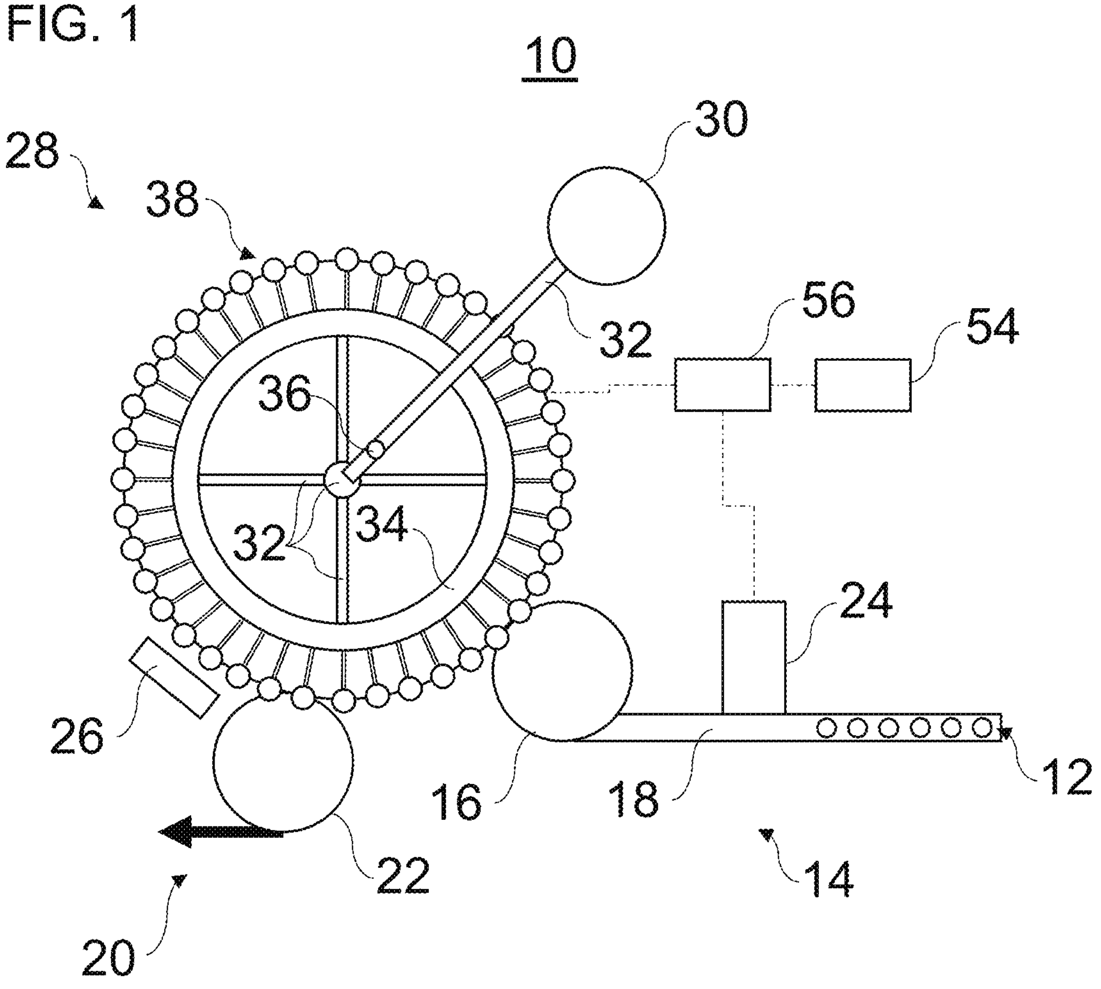
FIG. 1 shows an apparatus for filling containers according to an exemplary embodiment of the present disclosure.
Figure 2:
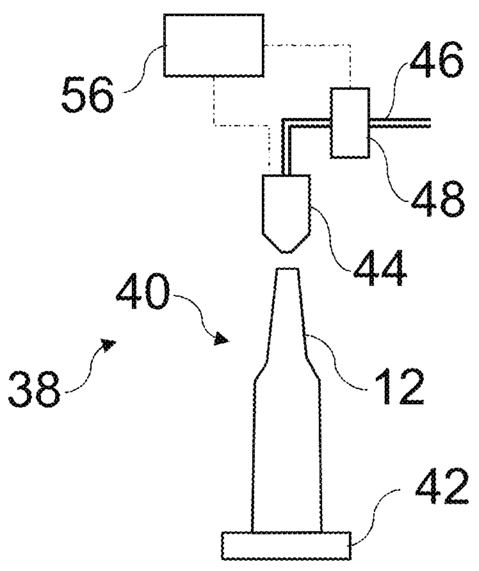
FIG. 2 shows an exemplary filling station.
Figure 3:
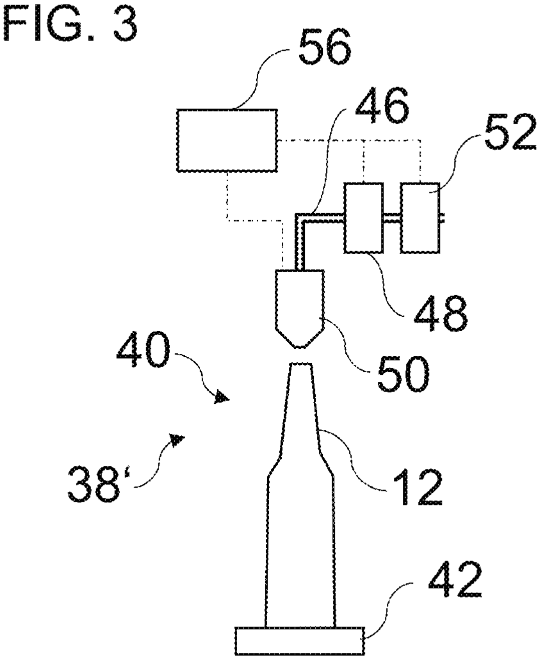
FIG. 3 shows another exemplary filling station.

FIG. 1 shows an apparatus 10 for filling containers 12. For the sake of clarity, only some containers 12 are shown in FIG. 1. FIG. 2 shows an exemplary filling station 38 of the apparatus 10. FIG. 3 shows an exemplary alternative embodiment of the filling station 38'.

The apparatus 10 is configured to fill the containers 12 with a preferably liquid or pasty filling material. The filling material can be carbonated.

The apparatus 10 comprises at least a closed loop control valve 36, 44, 52 and a diagnostic device 56. Optionally, the apparatus 10 can, for example, have a container conveyor 14, a (further) container conveyor 20, a container locking device 24, a cullet removal system 26, a filler 28, at least one filling station 38 and/or a user interface 54.

The container conveyor 14 can be arranged upstream (in the direction of movement of the containers) of the filler 28 or the at least one filling station 38. For example, the container conveyor 14 can have an infeed star wheel 16 and/or a conveyor portion 18.

The infeed star wheel 16 can transfer the containers 12 to the filler 28 or the at least one filling station 38, preferably individually or in individual transport.

The conveyor portion 18 can preferably be a single-track portion and/or configured for individual transport of the containers 12. The conveyor portion 18 can be arranged, for example, upstream (in the direction of movement of the containers) of the infeed star wheel 16. The containers can be transferred to the infeed star wheel 16 at one end of the conveyor portion 18, preferably individually or in individual transport. The conveyor portion 18 can, for example, be a conveyor portion of a linear conveyor.

The container conveyor 20 can be arranged downstream (in the direction of movement of the containers) of the filler 28 or the at least one filling station 38. For example, the container conveyor 20 can have an outfeed star wheel 22. The outfeed star wheel 22 can take over filled containers 12 from the at least one filling station 38, preferably individually or in individual transport.

Preferably, the containers 12 can be closed after filling. For example, the container conveyor 20 can convey the filled containers 12 to a closing device, e.g., a closer carousel.

The container locking device 24 can be arranged upstream (in the direction of movement of the containers) of the filler 28 or the at least one filling station 38. For example, the container locking device 24 can be arranged on the container conveyor 14, preferably on its conveyor portion 18.

The container locking device 24 can lock (or block) and release transport of the containers 12. For example, the container locking device 24 can extend or swing out a locking element to block transport of the containers 12. The blocking element can, for example, extend over the container conveyor 14. The containers 12 can be piled up on the blocking element, e.g., standing on the container conveyor 14. Preferably, the locking element can retract or pivot in order to release transport of the containers 12.

It is also possible for the container locking device 24 to be integrated, for example, in the infeed star wheel 16.

The cullet removal system 26 can remove cullets from destroyed containers in the filler 28 or in the at least one filling station 38. The cullet removal system 26 is preferably arranged in the region of an outlet of the filler 28 and/or adjacent to the outfeed star wheel 22. The cullet removal system 26 can be fluid-operated and/or fluid-dispensing. Preferably, the cullet removal system 26 can include a valve for blocking, releasing and/or adjusting a fluid flow. Preferably, the cullet removal system 26 can deliver a fluid, e.g., sterile air or sterile water, to a container receiving space of the at least one filling station 38, e.g., controlled by the valve. Preferably, the cullet removal system 26 can be configured as a cullet spraying system for spraying cullets out of the container receiving space of the at least one filling station 38.

The filler 28 can preferably be configured as a rotary filler or a filler carousel. For example, several filling stations 38 can be arranged distributed around a circumference of the filler 28.

It is possible for the filler 28 to be configured, for example, as a linear filler with several filling stations 38 arranged in parallel and/or one behind the other (not shown in the figures). It is also possible for the apparatus 10 or filler 28 to have only one filling station 38.

Preferably, the apparatus 10 or filler 28 can have a filling material source 30, a (filling material) pipeline system 32 and/or a filling material vessel 34.

The filling material source 30 can be configured as a filling material reservoir, for example. The filling material can be stored in the filling material reservoir. The filling material reservoir can be refillable. Preferably, the filling material source 30 can be arranged at a higher level than the filling material vessel 34.

The pipeline system 32 can connect the filling material source 30 and the filling material vessel 34 with each other. The pipeline system 32 can, for example, have a main line, which can be connected to the filling material source 30 at an upstream end of the main line. A filling material distributor of the pipeline system 32 can be arranged at a downstream end of the main line. Several distribution lines can branch off from the filling material distributor. The distribution lines can, for example, be connected to the filling material vessel 34 at different circumferential positions.

The filling material vessel 34 is preferably annular or configured as a ring vessel. The filling material vessel 34 can be connected to the filling stations 38 via several filling material lines.

The closed loop control valve 36 can be arranged upstream (in the direction of movement of the filling material) of the filling material vessel 34 and configured for closed-loop controlling a fill level or a pressure in the filling material vessel 34. In detail, the closed loop control valve 36 can, for example, adjust a flow of the filling material from the filling material source 30 to the filling material vessel 34 during closed loop control.

The closed loop control valve 36 can, for example, be arranged at an outlet of the filling material source 30 or in the pipeline system 32. The closed loop control valve 36 can preferably be arranged in the main line or the filling material distributor of the pipeline system 32.

For example, the closed loop control valve 36 can be continuously or discretely adjustable between a closed position with 0% flow cross section and a maximum open position with 100% flow cross section.

The closed loop control valve 36 can be operated, for example, electrically, electromagnetically, pneumatically, hydraulically or mechanically.

Preferably, the closed loop control valve 36 can have a movable, preferably displaceable, valve member for opening and closing the closed loop control valve 36. The valve member can preferably have a conical, particularly preferably frustoconical, portion, which can be lifted off from a valve seat of the closed loop control valve 36 to open the closed loop control valve 36.

A valve lift or valve opening of the closed loop control valve 36 is preferably a control variable of the closed loop control valve 36. The control variable is the output variable (the position) of the actuator (=closed loop control valve 36) used in the closed-loop control device, with the help of which a targeted intervention in the control process takes place. An actual valve lift or actual valve opening of the closed loop control valve 36 is preferably a control value of the closed loop control valve 36 or an instantaneous value of the control variable. The valve lift or valve opening can, for example, be specified in a standardized dimensionless manner, in % or in a unit of length or area, e.g., mm or $mm^2$.

A detected (measured) fill level of the filling material or a pressure in the filling material vessel 34 can be a closed loop control variable (process variable, regulating variable)

of the closed loop control valve 36. The closed loop control variable is the variable that is to be kept constant or deliberately varied by means of the closed loop control. A detected actual fill level of the filling material or actual pressure in the filling material vessel 34 can be an actual value/process value of the closed loop control variable. The (actual) fill level can be detected, for example, by a fill level sensor of the filling material vessel 34. The (actual) pressure can be detected, for example, by a pressure sensor of the filling material vessel 34.

A desired fill level or desired pressure in the filling material vessel 34 can be a reference variable (desired variable, set point variable) of the closed loop control valve 36. The reference variable is the variable to which the closed loop control variable is to be brought. The reference variable can vary over time. The reference variable can be specified, for example, by a user by means of the user interface 54 or a technical system of the apparatus 10. A control deviation can be calculated as a difference between the reference variable and the closed loop control variable or actual value/process value. The control value can then be formed accordingly and the system to be controlled can be influenced via the closed loop control valve 36 (=actuator).

The at least one filling station 38 can fill the containers 12 with a preferably liquid or pasty filling material. It is possible for the containers 12 to be capable of also being evacuated, prestressed and/or rinsed in the at least one filling station 38. Accordingly, the at least one filling station 38 can each have an evacuation channel, a biasing channel and/or a rinsing channel.

FIGS. 2 and 3 each show an exemplary embodiment of a filling station 38 or 38'.

The filling station 38 can have a receiving space 40, a container support 42, a closed loop control valve 44, a filling material channel 46 and/or a flow detection device 48.

One container 12 at a time can be received or positioned for filling in the receiving space 40.

The container 12 can be supported in the receiving space 40 by means of the container support 42 of the filling station 38. The container support 42 can, for example, have a base plate for supporting the respective container 12 on the bottom. Alternatively or additionally, the container support 42 can support the container 12, for example, on its shell or neck.

The closed loop control valve 44 can be configured as a filling valve. Preferably, the closed loop control valve 44 can be configured as a so-called proportional flow closed loop control valve.

The closed loop control valve 44 can release the filling material into the container 12, which is positioned in the receiving space 40 of the filling station 38. For example, the closed loop control valve 44 can be continuously or discretely adjustable between a closed position with 0% flow cross section and a maximum open position with 100% flow cross section.

The closed loop control valve 44 can be operated, for example, electrically, electromagnetically, pneumatically, hydraulically or mechanically.

Preferably, the closed loop control valve 44 can have a movable, preferably displaceable, valve member for opening and closing the closed loop control valve 44. The valve member can preferably have a conical, particularly preferably frustoconical, portion which can be lifted off from a valve seat of the closed loop control valve 44 to open the closed loop control valve 44.

It is possible for an outlet of the closed loop control valve 44 and a container mouth of the container 12 in the receiving space 40 to be capable of being pressed against each other for filling. For this purpose, the filling station 38 can have a, preferably vertical, adjustment device (not shown separately in the figures). The adjustment device can move the container support 42 (together with the supported container 12) toward and away from the outlet of the closed loop control valve 44. Alternatively or additionally, the adjustment device can move the closed loop control valve 44 toward and away from the container support 42 (or the supported container 12). The adjustment device can be operated electrically, electromagnetically, pneumatically, hydraulically or mechanically.

The closed loop control valve 44 can receive the filling material via the filling material channel 46. The filling material channel 46 can connect the closed loop control valve 44 to the filling material vessel 34 (see FIG. 1).

The flow detection device 48 can be configured to detect a filling material flow to the closed loop control valve 44. For example, the flow detection device 48 can detect a flow through the filling material channel 46. For example, the flow detection device 48 can measure the flow, e.g., in terms of quantity and/or volume. The flow detection device 48 can output a measurement signal indicating the detected flow, e.g., to the diagnostic device 56.

The flow detection device 48 can comprise any suitable flow measurement principle for detecting the flow. Particularly preferably, the flow detection device 48 can be a magnetic-inductive flow detection device or an ultrasonic flow detection device.

FIG. 3 shows a filling station 38' which is modified compared to FIG. 2.

The filling station 38' can have a filling valve 50 instead of the closed loop control valve 44. The filling valve 50 can, for example, be configured to selectively release or block the filling material channel 46. The filling valve 50 can release the filling material into the container 12, which is positioned in the receiving space 40 of the filling station 38'. The filling valve 50 can be operated, for example, electrically, electromagnetically, pneumatically, hydraulically or mechanically.

The filling valve 50 can have a movable, preferably displaceable, valve member for opening and closing the filling valve 50. The valve member can preferably have a conical, particularly preferably frustoconical, portion which can be lifted off from a valve seat of the filling valve 50 to open the filling valve 50. It is possible for an outlet of the filling valve 50 and a container mouth of the container 12 in the receiving space 40 to be capable of being pressed against each other for filling, as already described for the closed loop control valve 44.

The filling station 38' can comprise the closed loop control valve 52. The closed loop control valve 52 can, for example, be arranged in the filling material channel 46. The closed loop control valve 52 can be arranged upstream (in the direction of movement of the filling material) of the filling valve 50. The closed loop control valve 52 can be arranged upstream (in the direction of movement of the filling material) or downstream (in the direction of movement of the filling material) of the flow detection device 48.

Furthermore, the closed loop control valve 52 can be configured as already described for the closed loop control valve 44.

A valve lift or valve opening of the closed loop control valve 44, 52 is preferably a control variable of the closed loop control valve 44, 52. The control variable is the output variable (the position) of the actuator (=closed loop control valve 44, 52) used in the closed-loop control device, with the help of which a targeted intervention in the control process takes place. An actual valve lift or actual valve opening of the closed loop control valve 44, 52 is preferably a control value of the closed loop control valve 44, 52 or an instantaneous value of the control variable. The valve lift or valve opening can, for example, be specified in a standardized dimensionless manner, in % or in a unit of length or area, e.g., mm or $mm^2$.

A detected (measured) flow of the filling material through the filling material channel 46 (or the closed loop control valve 44, 52) can be a closed loop control variable (regulating variable, process variable) of the closed loop control valve 44, 52. The closed loop control variable is the variable that is to be kept constant or deliberately varied by means of the closed loop control. A recorded actual flow of the filling material through the filling material channel 46 can be an actual value/process value of the closed loop control variable. The (actual) flow can be detected, for example, by the flow detection device 48.

A desired flow through the closed loop control valve 44, 52 or filling material channel 46 can be a reference variable (desired variable, set point variable) of the closed loop control valve 44, 52. The reference variable is the variable to which the closed loop control variable is to be brought. The reference variable can vary over time. The reference variable can be specified, for example, by a user by means of the user interface 54 or a technical system of the apparatus 10. A control deviation can be calculated as a difference between the reference variable and the closed loop control variable or actual value/process value. The control value can then be formed accordingly, and the system to be controlled can be influenced via the closed loop control valve 44, 52 (=actuator).

In FIG. 2, the filling station 38 comprises closed loop control valve 44, and in FIG. 3, the filling station 38' comprises closed loop control valve 52. It is also possible for a filling station 38 of the apparatus 10 or filler 28 to have no closed loop control valve at all. The apparatus 10 or filler 28 could, for example, only comprise the closed loop control valve 36 (see FIG. 1).

It is possible for the at least one closed loop control valve 36, 44, 52 to be connected to a closed-loop control device of the apparatus 10 (not shown in the figures). The closed-loop control device can receive signals from the at least one closed loop control valve 36, 44, 52 and/or output signals to the at least one closed loop control valve 36, 44, 52. Actual closed loop control can be implemented electronically and/or by program in the closed-loop control device. It is also possible for the closed-loop control device to be at least partially included in the at least one closed loop control valve 36, 44, 52.

Closed loop control of the at least one closed loop control valve 36, 44, 52 can, for example, be a closed loop control with proportional behavior (P element), with integral behavior (I element) and/or with differential behavior (D element).

The user interface 54 can include an output device and/or an input device.

The output device can, for example, be an acoustic, visual and/or haptic output device. Information can be output to a user via the output device. The output device can, for example, have a (e.g., touch-sensitive) display, a loudspeaker and/or at least one signal light.

For example, information determined by the diagnostic device regarding a state of functionality of the at least one closed loop control valve 36, 44, 52 can be output to a user by means of the output device. For example, a warning or alert can be issued when an impaired state of functionality is detected.

The input device can, for example, be an acoustic, visual and/or tactile input device. Information, preferably input commands, can be input by a user via the input device. The input device can, for example, have a touch-sensitive display, a keyboard, at least one button or switch or the like, a camera and/or a microphone. The input information can be stored, for example, in a data memory of the diagnostic device 56.

The diagnostic device 56 is configured to monitor the functionality of the at least one closed loop control valve 36, 44, 52.

The diagnostic device 56 can be connected to any component described herein for sending and/or receiving signals. In particular, the diagnostic device 56 can be connected to the at least one closed loop control valve 36, 44, 52 and/or its closed-loop control device for sending and/or receiving signals.

The diagnostic device 56 monitors a respective control value of a control variable of the at least one closed loop control valve 36, 44, 52 during closed loop control. The diagnostic device 56 can monitor the respective control value of the at least one closed loop control valve 36, 44, 52 simultaneously with closed-loop controlling. In other words, closed loop control by means of the at least one closed loop control valve 36, 44, 52 takes place, and in addition the diagnostic device 56 monitors the respective control value of the at least one closed loop control valve 36, 44, 52.

In detail, the diagnostic device 56 can monitor the control value during a period of time in which closed loop control is carried out by means of the respective closed loop control valve 36, 44, 52.

The diagnostic device 56 determines a state of functionality of the respective closed loop control valve 36, 44, 52 as a function of monitoring. For example, the diagnostic device 56 can determine a normal state of functionality or an impaired state of functionality.

Different variants of monitoring and determining the state of functionality that can be combined with each other are explained below. For ease of understanding, an exemplary normal operation of the closed loop control valve 36 is initially explained with reference to FIG. 4.

Figure 4:
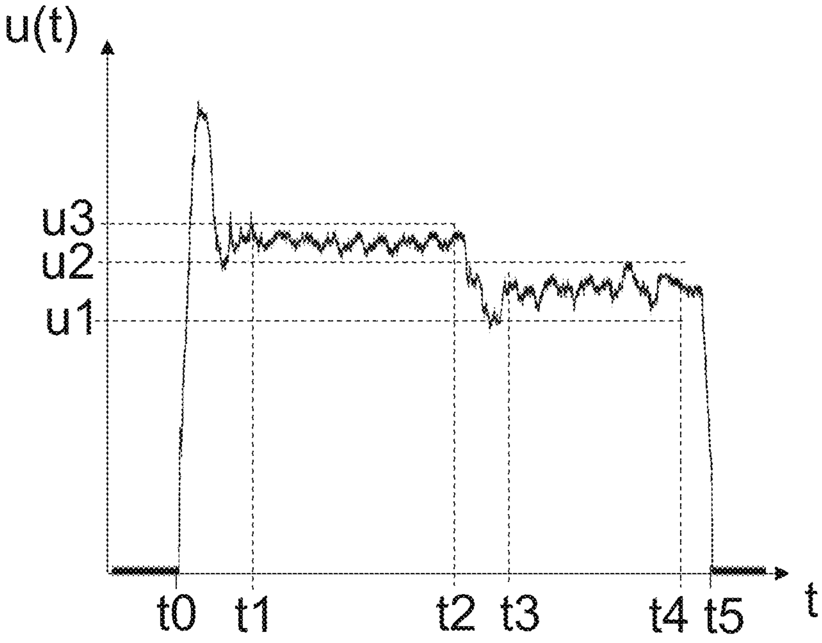
FIG. 4 shows a time-control value/control variable diagram of a closed loop control valve of the exemplary apparatus.

FIG. 4 shows an example of a control value or control variable u (t) (=valve lift or valve opening) of the closed loop control valve 36 over time t in a normal state of functionality of the closed loop control valve 36.

A start of the apparatus 10 can take place at a time to. At this point in time, for example, it is possible to start the filling of the containers 12 and/or the filling material vessel 34. Accordingly, the closed loop control valve 36 can be opened to allow (re-)filling of the filling material vessel 34. A transient response of the control value of the closed loop control valve 36 can take place from time t0 to time t1. Between times t1 and t2 the control value can be in a steady state. The control value can be substantially constant or fluctuate only slightly. Here, the apparatus 10 can show substantially constant operating conditions. At time t2, a reduction in the output of the apparatus 10 or filler 28 can occur, e.g.: from 60,000 containers per hour to 40,000 containers per hour. A transient response of the control value of the closed loop control valve 36 can take place again from time t2 to time t3. Between times t3 and t4 the control value can be in a steady state again. The control value can be substantially constant or fluctuate only slightly. Here, the apparatus 10 can again show substantially constant operating conditions. A stop of the apparatus 10 can be initiated at a time t4. Between time t4 and time t5, less and less filling material needs to be fed into the filling material vessel 34.

The closed loop control valve 36 can be closed until time t5. The control value can be reduced to zero until time t5.

Preferably, the control value of the closed loop control valve 36 can be monitored in a specified time window, and the state of functionality of the closed loop control valve 36 can be determined as a function of the control value monitored in the specified time window.

With reference to FIG. 4, a specified time window can be between t1 and t2 and/or between t3 and t4. In general, the specified time window can be determined by one or more conditions. The specified time window can begin, for example, after a (e.g., container filling) start-up phase of the apparatus 10. The specified time window can, for example, begin no earlier than 1 min, no earlier than 2 min or no earlier than 3 min after a (e.g., container filling) start of the apparatus 10. The specified time window can end, for example, before a (e.g., container filling) stop phase of the apparatus 10. The specified time window can, for example, end no later than 3 min, no later than 2 min or no later than 1 min before a (container filling) stop of the apparatus 10. The specified time window can, for example, end before a change in the output of the apparatus 10 and/or begin after a change in the output of the apparatus 10.

Preferably, the control value of the closed loop control valve 36 can be monitored in a steady state of the control value, and the state of functionality of the closed loop control valve 36 can be determined as a function of the control value monitored in the steady state.

With reference to FIG. 4, the control value can be steady between t1 and t2 and/or between t3 and t4. In general, a steady state can exist if the control value fluctuates around a mean value over time. In the steady state, the control value can fluctuate around the mean value in a range between ±5%, preferably ±3%, for example. In the steady state, a course of the control value can be free of trends, etc. In the steady state, the control value can, for example, fluctuate by not more than 7%, not more than 6% or not more than 5%.

Preferably, the control value of the closed loop control valve 36 can be monitored such that the control value is monitored under constant operating conditions of the apparatus 10. The state of functionality of the closed loop control valve 36 can be determined as a function of the control value monitored under constant operating conditions.

With reference to FIG. 4, substantially constant operating conditions of the apparatus 10 can exist between t1 and t2 and/or between t3 and t4. In general, the diagnostic device 56 can determine that constant operating conditions exist when one or more conditions are met. For example, an output of the apparatus 10 can be substantially constant and within a specified output range. For example, the container locking device 24 can be open. For example, a fill level in the filling material vessel 34 can be substantially constant and within a specified fill level range. For example, a pressure in the filling material vessel 34 can be substantially constant and within a specified pressure range. For example, a valve of the cullet removal system 26 can be closed. For example, a pre-pressure of the filling material when fed to the filling material vessel 34 can be substantially constant and within a specified pre-pressure range. For example, a temperature of the filling material can be substantially constant and within a specified temperature range.

Preferably, the state of functionality of the closed loop control valve 36 can also be determined as a function of a permissible control value range. If the monitored control value is, for example, within the permissible control value range, a normal state of functionality of the closed loop control valve 36 can be determined, i.e., the closed loop control valve 36 is functioning normally. If, for example, the monitored control value is outside the permissible control value range, an impaired state of functionality of the closed loop control valve 36 can be determined, e.g., the closed loop control valve 36 is not functioning, is not functioning completely, is functioning abnormally, or a failure due to wear is to be expected.

With reference to FIG. 4, a first permissible control value range can, for example, be between u2 and u3. For example, the first permissible control value range for the steady state between t1 and t2, the constant operating conditions between t1 and t2 and/or the specified time window between 1 and t2 can be specified.

With reference to FIG. 4, a second permissible control value range can, for example, be between u1 and u2. For example, the second permissible control value range for the steady state between t3 and t4, the constant operating conditions between t3 and t4 and/or the specified time window between t3 and t4 can be specified.

In general, the permissible control value range can, for example, be in a range ≥50%, ≥55% or ≥60% and/or ≤75%, ≤70% or ≤65% of a maximum value of the control variable. The permissible control value range can be specified as a function of at least one parameter. For example, the permissible control value range can be specified as a function of an output of the apparatus 10 (see, e.g., FIG. 4—first permissible control value range at 60,000 containers per hour; second permissible control value range at 40,000 containers per hour), a format and/or a filling volume of the containers 12, a fill level of the filling material vessel 34, a pressure in the filling material vessel 34, a pre-pressure of the filling material upstream of the filling material vessel 34 and/or a temperature of the filling material. This means that different permissible control value ranges can be specified for different parameters, if desired.

The above description of monitoring the control value of the closed loop control valve 36 and determining its state of functionality can also be applied to the closed loop control valve 44 or 52. Preferably, however, monitoring of the control value of the closed loop control valve 44, 52 and determining a state of functionality of the closed loop control valve 44, 52 can be carried out as explained below by way of example with reference to FIG. 5.

Figure 5:
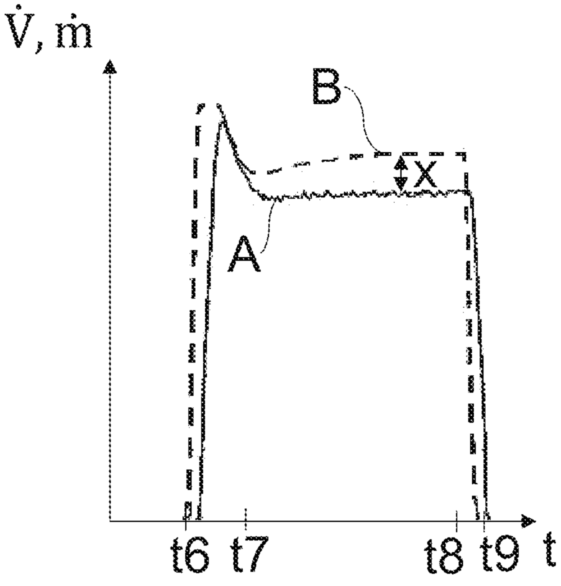
FIG. 5 shows a time-flow diagram of a closed loop control valve of the exemplary apparatus.

FIG. 5 shows an example of a detected flow (solid curve A) through the closed loop control valve 44, 52 over time t for a filling process of a container 12.

At time t6, filling of the container 12 can begin. Between time t6 and time t7, the control value of the closed loop control valve 44, 52 and thus the measured flow can stabilize. From time t7 to time t8, the control value of the closed loop control valve 44, 52 and thus the detected flow can be substantially constant or steady. A filling stop can be initiated from time t8. The closed loop control valve 44, 52 starts to close. The detected flow can decrease. Filling of the container 12 may be completed at a time t9. The control value of the closed loop control valve 44, 52 and the detected flow can be zero.

FIG. 5 also shows a theoretical flow (curve B) through the closed loop control valve 44, 52 over time t for the filling process of container 12. In detail, the theoretical flow can be determined, e.g., calculated, from the monitored control value of the closed loop control valve 44, 52. For example, a respective flow cross-sectional area can be determined from the monitored control value, and the theoretical flow can be determined therefrom. Determination can, for example, be carried out, or supported, mathematically, empirically and/or simulatively.

By comparing the measured filling material flow with a theoretical filling material flow, the diagnostic device 56 can now determine the state of functionality of the closed loop control valve 44, 52. The comparison can preferably be carried out for a constant flow phase, a specified time window and/or a steady state of the control value/flow (see also explanations regarding FIG. 4). If a deviation x between the measured flow (curve A) and the theoretical flow (curve B) in the monitored time period is, for example, greater than a specified limit value, an impaired state of functionality of the closed loop control valve 44, 52 can be determined. If a deviation x between the measured flow (curve A) and the theoretical flow (curve B) in the monitored time period is smaller than a specified limit value, a normal state of functionality of the closed loop control valve 44, 52 can be determined.

The above description of monitoring the control value of the closed loop control valve 44, 52 and determining its state of functionality can also be applied to the closed loop control valve 36. The procedures can also be combined.

The invention is not limited to the preferred exemplary embodiments described above. Rather, a plurality of variants and modifications are possible which likewise make use of the inventive concept and therefore fall within the scope of protection. In particular, the invention also claims protection for the subject matter and the features of the dependent claims, irrespective of the claims to which they refer. In particular, the individual features of independent claim 1 are each disclosed independently of one another. All ranges specified herein are to be understood as disclosed in such a way that all values falling within the respective range are individually disclosed, e.g., also as the respective preferred narrower outer limits of the respective range.

LIST OF REFERENCE SIGNS

10 apparatus for filling containers
12 containers
14 container conveyor
16 infeed star wheel
18 conveyor portion
20 container conveyor
22 outfeed star wheel
24 container locking device
26 cullet removal system
28 filler
30 filling material source
32 pipeline system
34 filling material vessel
36 closed loop control valve
38 filling station
40 receiving space
42 container support
44 closed loop control valve
46 filling material channel
48 flow detection device
50 filling valve
52 closed loop control valve
54 user interface
56 diagnostic device

What is claimed is:

1. An apparatus for filling containers with a filling material, wherein the apparatus comprises:
a closed loop control valve for the filling material; and
a diagnostic device that is configured:
to monitor a control value of a control variable of the closed loop control valve during closed loop control; and
to determine a state of functionality of the closed loop control valve as a function of the monitored control value.

2. The apparatus according to claim 1, wherein the control variable is one of a valve lift and a valve opening of the closed loop control valve, and the state of functionality is a state of wear of the closed loop control valve.

3. The apparatus according to claim 1, wherein:
the diagnostic device is further configured to determine the state of functionality of the closed loop control valve also as a function of a permissible control value range.

4. The apparatus according to claim 3, wherein:
the state of functionality of the closed loop control valve is at least one of determined as an impaired state of functionality if the monitored control value is outside the permissible control value range, and determined as a normal state of functionality if the monitored control value is within the permissible control value range.

5. The apparatus according to claim 3, wherein at least one of:
the permissible control value range is at least one of ≥50% and ≤75% of a maximum value of the control variable; and
the permissible control value range is specified as a function of at least one of:
an output of the apparatus;
at least one of a format and a filling volume of the containers;
a fill level in a filling material vessel of the apparatus; and
a pressure in a filling material vessel of the apparatus;
a pre-pressure of the filling material upstream of a filling material vessel of the apparatus; and
a temperature of the filling material.

6. The apparatus according to claim 1, wherein:
the diagnostic device is further configured:
to monitor the control value of the closed loop control valve during closed loop control such that the control value is monitored in at least one of a specified time window and in a steady state; and
to determine the state of functionality of the closed loop control valve as a function of the monitored control value such that the state of functionality of the closed loop control valve is determined as a function of the control value monitored in the at least one of the specified time window and in the steady state.

7. The apparatus according to claim 6, wherein the specified time window at least one of:
begins after a start-up phase of the apparatus; and
begins no earlier than 1 min after the apparatus has been started; and
ends before a stop phase of the apparatus; and
ends no later than 1 min before a stop of the apparatus; and
ends before a change in the output of the apparatus and/or begins after a change in the output of the apparatus.

8. The apparatus according to claim 1, wherein:
the diagnostic device is further configured:
to monitor the control value of the closed loop control valve during closed loop control such that the control value is monitored under substantially constant operating conditions of the apparatus; and to determine the state of functionality of the closed loop control valve as a function of the monitored control value such that the state of functionality is determined as a function of the control value monitored at the substantially constant operating conditions.

9. The apparatus according to claim 8, wherein the diagnostic device is further configured to determine that substantially constant operating conditions exist when at least one of the following applies:

an output of the apparatus is within a specified output range;

a container locking device of the apparatus is open;

a fill level in a filling material vessel of the apparatus is within a specified fill level range;

a pressure in a filling material vessel of the apparatus is within a specified pressure range;

a valve of a cullet removal system of the apparatus is closed;

a pre-pressure of the filling material when fed to a filling material vessel of the apparatus is within a specified pre-pressure range; and a temperature of the filling material is within a specified temperature range.

10. The apparatus according to claim 1, further comprising:

a flow detection device arranged to detect a filling material flow through the closed loop control valve, wherein:

the diagnostic device is further configured to determine the state of functionality of the closed loop control valve also as a function of a filling material flow detected by the flow detection device.

11. The apparatus according to claim 1, further comprising:

an output device for outputting information to a user;

wherein the diagnostic device is further configured to operate the output device such as to output information regarding the determined state of functionality.

12. A method for determining the functionality of a closed loop control valve of an apparatus for filling containers with a filling material, wherein the method comprises:

closed loop controlling via the closed loop control valve;

monitoring a control value of a control variable of the closed loop control valve via a diagnostic device during the closed loop controlling; and determining a state of functionality of the closed loop control valve as a function of the monitored control value via the diagnostic device.

13. The method according to claim 12, wherein one of:

the control variable is one of a valve lift and a valve opening of the closed loop control valve, and the method further comprises outputting the determined state of functionality to a user via an output device.

14. The method according to claim 12, wherein:

determining the state of functionality of the closed loop control valve is further dependent on a permissible control value range.

15. The method according to claim 12, wherein the state of functionality of the closed loop control valve is at least one of determined as an impaired state of functionality if the monitored control value is outside the permissible control value range, and determined as a normal state of functionality if the monitored control value is within the permissible control value range.

16. The method according to claim 12, wherein:

the control value is monitored at least one of in a specified time window, in a steady state of the control value and under substantially constant operating conditions of the apparatus; and the state of functionality of the closed loop control valve is determined as a function of the control value monitored at least one of in the specified time window, in the steady state and under the substantially constant operating conditions.

17. The method according to claim 12, further comprising:

detecting a filling material flow through the closed loop control valve via a flow detection device, wherein the state of functionality of the closed loop control valve is also determined as a function of the detected filling material flow.

18. The method according to claim 17, wherein the state of functionality of the closed loop control valve is also determined as the function of the detected filling material flow by comparing the detected filling material flow and a theoretical filling material flow through the closed loop control valve, which flow is determined as a function of the monitored control value.

19. The apparatus according to claim 1, wherein one of:

the apparatus has a filling material vessel, and the closed loop control valve is arranged upstream of the filling material vessel for closed-loop controlling a fill level or a pressure in the filling material vessel;

the closed loop control valve is a filling valve, with which the filling material can be delivered to a container for filling the container, for closed-loop controlling the flow of the filling material; and the closed loop control valve is connected to a filling valve, with which the filling material can be delivered to a container for filling the container, for closed-loop controlling the flow of the filling material.

20. The apparatus according to claim 1, wherein one of:

the apparatus has at least one filling station for filling the containers, and the closed loop control valve is included in the at least one filling station or connected to the at least one filling station; and the apparatus further comprises a rotary filler which comprises the closed loop control valve.

* * * * *